US012620132B2

(12) United States Patent
Kong et al.

(10) Patent No.: US 12,620,132 B2
(45) Date of Patent: May 5, 2026

(54) DEPTH ESTIMATION APPARATUS, CALIBRATION METHOD, AND NON-TRANSITORY COMPUTER READABLE RECORDING MEDIUM

(71) Applicant: TOYOTA JIDOSHA KABUSHIKI KAISHA, Aichi-ken (JP)

(72) Inventors: Quan Kong, Tokyo-to (JP); Mustafa Erdogan, Tokyo-to (JP); Norimasa Kobori, Tokyo-to (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 302 days.

(21) Appl. No.: 18/611,699

(22) Filed: Mar. 21, 2024

(65) Prior Publication Data

US 2024/0386608 A1     Nov. 21, 2024

(30) Foreign Application Priority Data

May 19, 2023     (JP) ................................. 2023-083343

(51) Int. Cl.
    *G06T 7/80*        (2017.01)
    *G06T 7/50*        (2017.01)
(52) U.S. Cl.
    CPC . *G06T 7/80* (2017.01); *G06T 7/50* (2017.01)
(58) Field of Classification Search
    CPC .................................... G06T 7/80; G06T 7/50
    See application file for complete search history.

(56) References Cited

U.S. PATENT DOCUMENTS

| | | | |
|---|---|---|---|
| 2003/0146922 A1* | 8/2003 | Navab .................... | G01N 33/84 |
| | | | 345/633 |
| 2010/0201809 A1 | 8/2010 | Oyama et al. | |
| 2010/0322517 A1* | 12/2010 | Kobayashi .............. | G06T 7/579 |
| | | | 382/173 |
| 2011/0181770 A1* | 7/2011 | Rapaport ............. | H04N 23/959 |
| | | | 348/E5.045 |
| 2012/0236119 A1* | 9/2012 | Rhee ..................... | G01S 3/7864 |
| | | | 348/46 |
| 2014/0168378 A1* | 6/2014 | Hall ..................... | H04N 13/257 |
| | | | 348/47 |

(Continued)

FOREIGN PATENT DOCUMENTS

| | | |
|---|---|---|
| CN | 109696663 A | 4/2019 |
| JP | 2013-187822 A | 9/2013 |

(Continued)

*Primary Examiner* — Aaron W Carter
(74) *Attorney, Agent, or Firm* — HAUPTMAN HAM, LLP

(57) ABSTRACT

A depth estimation apparatus executes a first process of calculating a calibration value for an estimated depth and a second process of calibrating the estimated depth based on the calibration value. The first process includes: specifying a plane area in the image in which a horizontal plane or vertical plane is reflected; setting a plurality of partial regions in the image; calculating a regression plane representing the horizontal plane or the vertical plane for each partial region; and calculating the calibration for each partial region by comparing an installation position of the camera with a position of the camera with respect to the regression plane. The second process includes calibrating the estimated depth for each partial region based on the calibration value corresponding to each partial region.

5 Claims, 6 Drawing Sheets

(56)         References Cited

U.S. PATENT DOCUMENTS

| 2014/0368615 | A1 * | 12/2014 | van Baar | G01S 17/894 |
| | | | | 382/154 |
| 2015/0302570 | A1 | 10/2015 | Shirakyan et al. | |
| 2017/0064288 | A1 * | 3/2017 | Wang | H04N 17/002 |
| 2018/0157328 | A1 * | 6/2018 | Brunner | G06T 7/50 |
| 2019/0164350 | A1 * | 5/2019 | Yen | G06T 3/18 |
| 2020/0074659 | A1 * | 3/2020 | Nakagawa | G06V 10/752 |
| 2020/0184684 | A1 * | 6/2020 | Ma | G06T 7/174 |
| 2020/0226774 | A1 * | 7/2020 | Kaino | G06F 3/01 |
| 2020/0314410 | A1 * | 10/2020 | Gotoh | H04N 13/271 |
| 2021/0065402 | A1 * | 3/2021 | Wang | G01S 17/36 |
| 2024/0221199 | A1 * | 7/2024 | Kulbida | G06T 7/80 |
| 2024/0386608 | A1 * | 11/2024 | Kong | G06T 7/50 |

FOREIGN PATENT DOCUMENTS

| JP | 2021-117130 A | 8/2021 |
| WO | 2009/141998 A1 | 11/2009 |

* cited by examiner

100

PROCESSING UNIT

200

CAMERA

300

USER INTERFACE

110

PROCESSOR

120

MEMORY

121

COMPUTER PROGRAM

122

CALIBRATION VALUE

123

INSTALLATION POSITION INFORMATION

10

DEPTH ESTIMATION APPARATUS, CALIBRATION METHOD, AND NON-TRANSITORY COMPUTER READABLE RECORDING MEDIUM

CROSS-REFERENCE TO RELATED APPLICATION

The present disclosure claims priority to Japanese Patent Application No. 2023-083343, filed on May 19, 2023, the contents of which application are incorporated herein by reference in their entirety.

TECHNICAL FIELD

The present disclosure relates to a technique for analyzing an image captured by a camera to estimate a depth in the image.

BACKGROUND ART

Patent Literature 1 discloses, regarding a ranging apparatus including a plurality of imaging systems, a calibration method for estimating a camera parameter representing characteristics of each of the plurality of imaging systems. In the calibration method disclosed in Patent Literature 1, the camera parameter is estimated using information acquired by capturing an image of a reference chart positioned to be in a predetermined positional relationship with the ranging apparatus.

In addition, there are the following Patent Literature 2 and Patent Literature 3 as documents showing the technical level of this technical field.

LIST OF RELATED ART

Patent Literature 1: WO 2009/141998 A1
Patent Literature 2: JP 2021/117130 A
Patent Literature 3: JP 2013/187822 A

SUMMARY

The technique disclosed in Patent Literature 1 is applied to an apparatus (e.g., an apparatus using a stereo camera) that recognizes a depth in an image by detecting disparity between multiple images.

On the other hand, a technique of estimating a depth in an image by analyzing one image captured by a monocular camera or the like has been considered. Such a technique has the advantage of low cost and space saving because it requires less equipment. Further, it has also the advantage of being applicable to cameras used for other purposes. Particularly in recent years, it has been considered to analyze an image using a trained machine learning model.

By the way, the appearance of an image to be analyzed changes depending on the characteristics of a camera that captures the image. Therefore, in order to ensure estimation accuracy, it is required to perform calibration according to the appearance of the image and the characteristics of the camera.

However, in the related art, performing calibration requires manual work or an additional equipment, resulting in considerable effort and cost. For example, when analyzing an image using a trained machine learning model, calibration is performed by retraining the parameters.

An object of the present disclosure is to provide a technique for analyzing an image to estimate a depth in the image, which is capable of realizing highly accurate depth estimation without requiring manual work or an additional equipment.

A first aspect of the present disclosure relates to a depth estimation apparatus.

The depth estimation apparatus comprises:

one or more processors configured to analyze an image captured by a camera to estimate a depth in the image; and a memory storing information on an installation position of the camera with respect to a horizontal plane or a vertical plane.

The one or more processors are further configured to execute:

a first process of calculating a calibration value for an estimated depth; and a second process of calibrating the estimated depth based on the calibration value.

The first process includes:

specifying a plane area in the image in which the horizontal plane or the vertical plane is reflected;

setting a plurality of partial regions in the image;

calculating a regression plane, for each of the plurality of partial regions, representing the horizontal plane or the vertical plane based on the estimated depth of the plane area included in the each partial region; and calculating the calibration value for each of the plurality of partial regions by comparing the installation position with a position of the camera with respect to the regression plane.

The second process includes calibrating the estimated depth for each of the plurality of partial regions based on the calibration value corresponding to the each partial region.

A second aspect of the present disclosure relates to a calibration method for calibrating an estimated depth in an image captured by a camera.

The calibration method, which is executed by a computer, comprises:

acquiring information on an installation position of the camera with respect to a horizontal plane or a vertical plane;

specifying a plane area in the image in which the horizontal plane or the vertical plane is reflected;

setting a plurality of partial regions in the image;

calculating a regression plane, for each of the plurality of partial regions, representing the horizontal plane or the vertical plane based on the estimated depth of the plane area included in the each partial region;

calculating the calibration value for each of the plurality of partial regions by comparing the installation position with a position of the camera with respect to the regression plane; and calibrating the estimated depth for each of the plurality of partial regions based on the calibration value corresponding to the each partial region.

A third aspect of the present disclosure relates to a calibration program for calibrating an estimated depth in an image captured by a camera.

The calibration program, when executed by a computer, causes the computer to execute:

acquiring information on an installation position of the camera with respect to a horizontal plane or a vertical plane;

specifying a plane area in the image in which the horizontal plane or the vertical plane is reflected;

setting a plurality of partial regions in the image;

calculating a regression plane, for each of the plurality of partial regions, representing the horizontal plane or the vertical plane based on the estimated depth of the plane area included in the each partial region;

calculating the calibration value for each of the plurality of partial regions by comparing the installation position with a position of the camera with respect to the regression plane; and calibrating the estimated depth for each of the plurality of partial regions based on the calibration value corresponding to the each partial region.

According to the present disclosure, it is possible to calculate an appropriate calibration value for each of a plurality of partial regions set in an image without requiring manual work or an additional equipment. Then, in the each partial region, calibration of an estimated depth is performed based on the calibration value corresponding to the each partial region. It is thus possible to realize highly accurate depth estimation without requiring manual work or an additional equipment.

DETAILED DESCRIPTION

Hereinafter, the present embodiment will be described with reference to the drawings.

1. Depth Estimation Apparatus

Figure 1:
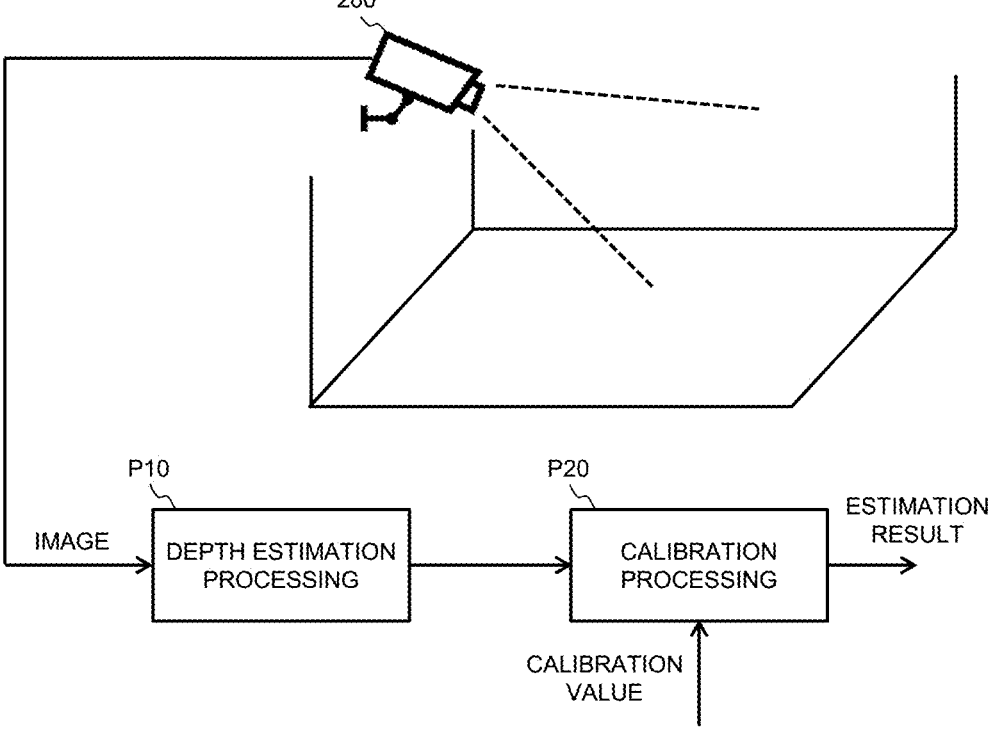
FIG. 1 is a diagram for explaining the function of a depth estimation apparatus according to the present embodiment.

FIG. 1 is a diagram for explaining basic functions of a depth estimation apparatus 10 according to the present embodiment. The depth estimation apparatus 10 analyzes an image captured by the camera 200 and estimates a depth in the image.

The camera 200 is installed so as to capture an image of an arbitrary area at a depth of measure. The camera 200 outputs data of a captured image. The camera 200 may output video data composed of continuously captured images. In the present embodiment, the configuration of the camera 200 is not particularly limited.

The depth estimation apparatus 10 performs depth estimation processing P10 and calibration processing P20 on an image captured by the camera 200.

The depth estimation processing P10 analyzes an image to estimate a depth in the image. The depth in the image is for example given for each pixel of the image. In this case, when each pixel is represented by coordinates (M, N) on the image, the depth in the image can be represented by D (M, N). D (M, N) indicates the magnitude of the depth given to the pixel corresponding to the coordinates (M, N) on the image. D (M, N) may also be referred to as a "depth map".

Figure 3C:
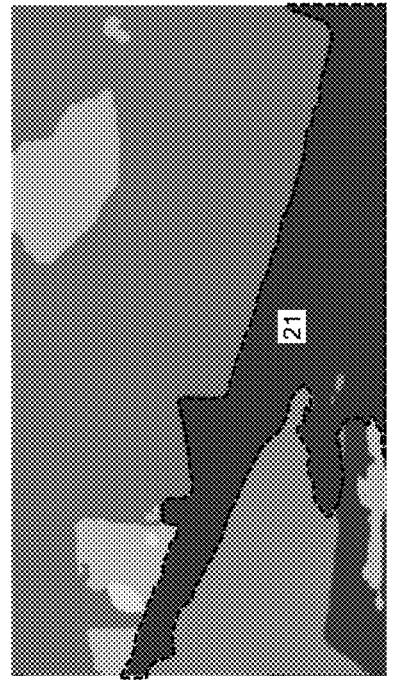
FIG. 3C is a diagram showing an example of an execution result of the process shown in FIG. 2.
Figure 3D:
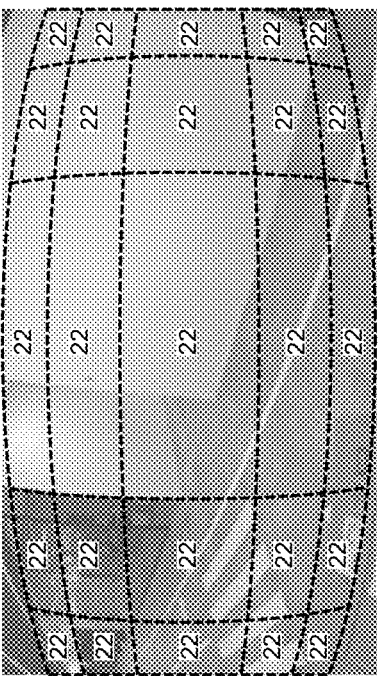
FIG. 3D is a diagram showing an example of an execution result of the process shown in FIG. 2.
Figure 3A:
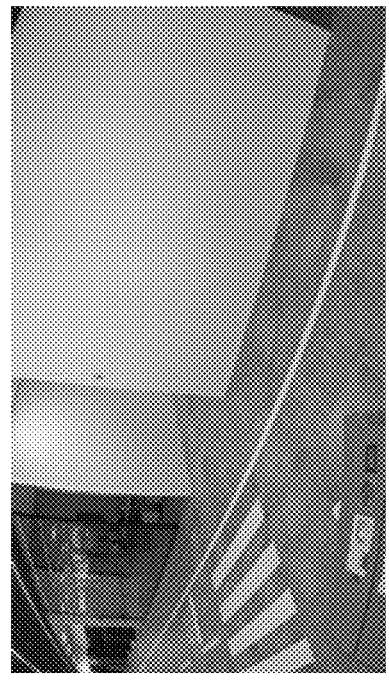
FIG. 3A is a diagram showing an example of an execution result of the process shown in FIG. 2.
Figure 3B:
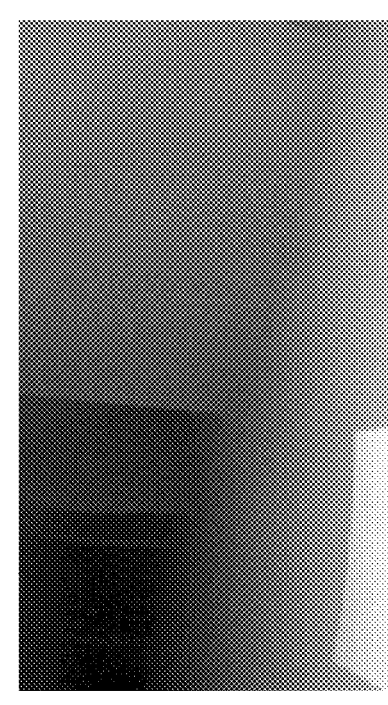
FIG. 3B is a diagram showing an example of an execution result of the process shown in FIG. 2.

FIG. 3A and FIG. 3B illustrate an example of an image captured by the camera 200 and an example of a depth estimated by the depth estimation processing P10, respectively. In FIG. 3B, the magnitude of the estimated depth is shown by shading with respect to the image shown in FIG. 3A. In particular, the graph shows that the density increases as the estimated depth increases.

A known suitable technique may be adopted as the method of the depth estimation processing P10. For example, the depth estimation processing P10 is configured to estimate a depth in an image using a learned machine learning model that takes the image as input.

In the depth estimation apparatus 10, the camera 200 may be selected from cameras having suitable characteristics according to the object to be imaged and the environment. If the characteristics of the camera 200 are different, the appearance of the image changes. On the other hand, the depth estimation processing P10 is usually optimized for an image captured by a specific camera. For example, when a learned machine learning model is used, the depth estimation processing P10 is optimized for an image used as training information. Therefore, the depth estimated by the depth estimation processing P10 may have errors according to the appearance of the image.

In particular, in the estimation of the depth, the influence of distortion that distorts the appearance of an image is large. In the image shown in FIG. 3A, a barrel-shaped distortion aberration occurs. As shown in FIG. 3A, the distortion increases as the distance from the center of the image increases. Therefore, it is considered that the error caused by the distortion aberration is different in each portion of the image and changes depending on the magnitude of the distortion.

Refer to FIG. 1 again. The calibration processing P20 performs calibration of the estimated depth in order to reduce such errors. In the calibration processing P20, calibration is performed based on the calibration value managed in the depth estimation apparatus 10. The depth estimation apparatus 10 outputs a result of the calibration processing P20 as an estimation result.

The depth estimation apparatus 10 according to the present embodiment calculates an appropriate calibration value according to the appearance of an image, thereby realizing highly accurate depth estimation. In particular, the depth estimation apparatus 10 according to the present embodiment can calculate the calibration value without requiring manual work or an additional device. Hereinafter, the process of calculating the calibration value and the calibration processing P20 based on the calculated calibration value will be described in detail.

2. Calculation of Calibration Value

The depth estimation apparatus 10 executes processing for calculating a calibration value at a predetermined timing. The predetermined timing may be suitably determined. For example, the predetermined timing is when the camera 200 is activated. Further, for example, the predetermined timing is periodically set at regular time intervals. Further, for example, the predetermined timing is when an instruction to update the calibration value is received from the user.

In the process of calculating the calibration value, the calibration value is calculated from the image captured by the camera 200 at a predetermined timing, the depth estimated by the depth estimation processing P10, and the installation position of the camera 200 with respect to a predetermined horizontal plane or vertical plane. Information on the installation position of the camera 200 with respect to the horizontal plane or the vertical plane may be managed in the depth estimation apparatus 10. The horizontal plane or the vertical plane for defining the installation position may be suitably selected according to the environment to which the present embodiment is applied. Typically, the horizontal surface is a floor or the ground. The vertical plane is a wall. The horizontal or vertical plane may be a surface of an object that is stationary around the camera 200. For example, the horizontal surface may be a top surface of a table. However, it is desirable that the horizontal plane or the vertical plane has a certain extent. The installation position of the camera 200 with respect to the horizontal plane is, for example, the height of the camera 200 with respect to the horizontal plane. The installation position of the camera 200 with respect to the vertical plane is, for example, the horizontal distance of the camera 200 with respect to the vertical plane. The depth estimation apparatus 10 may be configured to manage information on a plurality of installation positions with respect to each of a plurality of horizontal planes or vertical planes.

Figure 2:
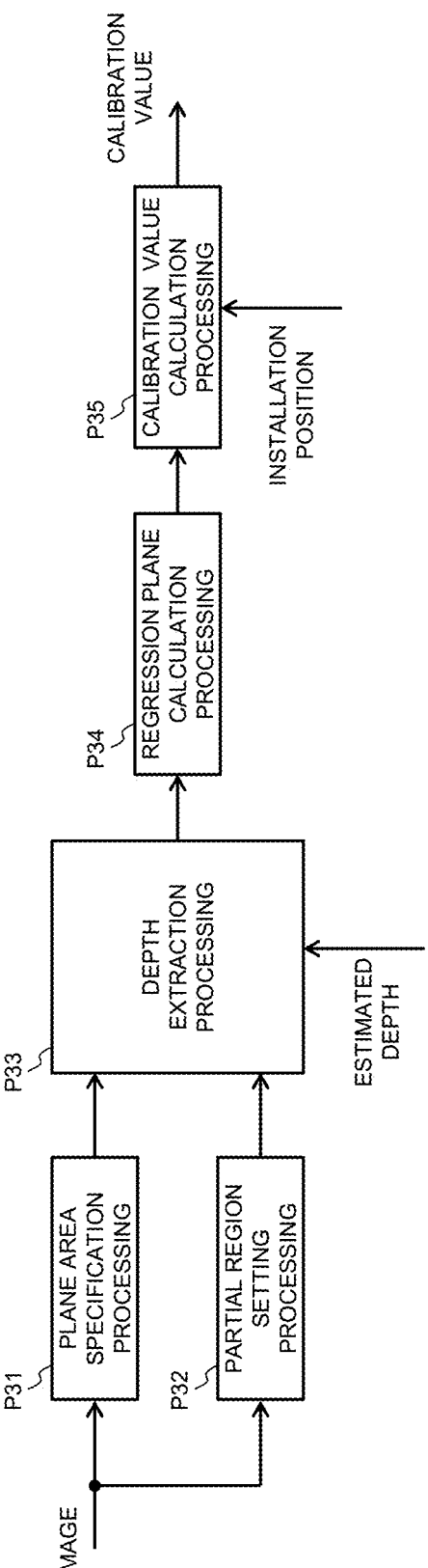
FIG. 2 is a diagram for explaining a process of calculating a calibration value.

The process of calculating the calibration value will be described below with reference to FIG. 2. The process of calculating the calibration value includes a plane area specification processing P31, a partial region setting processing P32, a depth extraction processing P33, a regression plane calculation processing P34, and a calibration value calculation processing P35.

The plane area specification processing P31 specifies a plane area in which a horizontal plane or a vertical plane is reflected in the image. FIG. 3C illustrates an example of the plane area 21 specified by the plane area specification processing P31. In FIG. 3C, a plane area 21 is an area in which the floor appears in the image shown in FIG. 3A. The plane area specification processing P31 can be realized by, for example, performing semantic segmentation on the image. In this case, the area of pixels labeled as a horizontal plane, or a vertical plane may be set as the plane area 21. The plane area specification processing P31 may specify a plurality of plane areas 21 for a plurality of horizontal planes or vertical planes. For example, the plane area specification processing P31 may further specify a region in which a wall is shown in the image illustrated in FIG. 3A as another plane area 21.

The partial region setting processing P32 sets a plurality of partial regions in an image. FIG. 3D illustrates an example of a plurality of partial regions 22 set by the partial region setting processing P32. As described above, it is considered that the error due to the distortion aberration is different in each portion of the image and changes depending on the magnitude of the distortion. Therefore, by setting the plurality of partial regions 22 in this way, it can be expected that the errors due to the distortion aberration are approximately the same in the respective partial regions 22.

Various patterns are considered as how to set the plurality of partial regions 22. For example, it is conceivable to set a plurality of partial regions 22 by dividing the image into grids. Further, for example, it is conceivable to set a plurality of partial regions 22 by arranging regions of a predetermined shape on an image.

In FIG. 3D, each partial region 22 is a region surrounded by sides having a curvature. In particular, the curvature is larger for the partial region 22 farther from the center of the image. The size of each partial region 22 is smaller as the partial region 22 is farther from the center of the image.

As described above, the distortion increases as the distance from the center of the image increases. Therefore, by increasing the curvature of the side of the partial region 22 farther from the center of the image, each partial region 22 can be formed in a shape corresponding to the change in distortion. Further, by making the size of each partial region 22 smaller as the partial region 22 is farther from the center of the image, the partial region 22 can be set more finely in a portion where distortion is large. That is, by giving the curvature of the side and the size of each partial region 22 in this way, it is possible to set a plurality of partial regions 22 more appropriate for making the errors accompanying the distortion aberration in the respective partial regions 22 approximately the same. In this case, each partial region 22 can be defined by, for example, the curvature of the side and the width and height of the region. The curvature of the sides and the width and height of the regions can then be optimally determined by tests.

Refer to FIG. 2 again. The depth extraction processing P33 extracts an estimated depth in the plane area 21 included in the partial region 22 for each partial region 22. The depth extracted for each partial region 22 is associated with the corresponding partial region 22. The depth extraction processing P33 can be realized by, for example, calculating a region of a common portion between the target partial region 22 and the plane area 21 and referring to the estimated depth using the calculated region of the common portion.

Figure 4A:
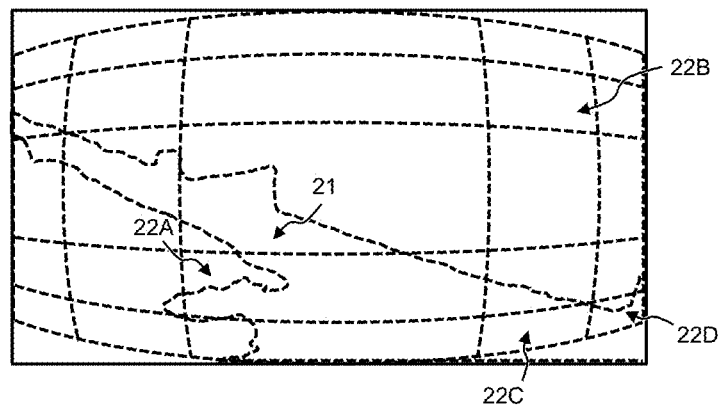
FIG. 4A is a diagram for explaining the execution result of the process shown in FIG. 2.
Figure 4B:
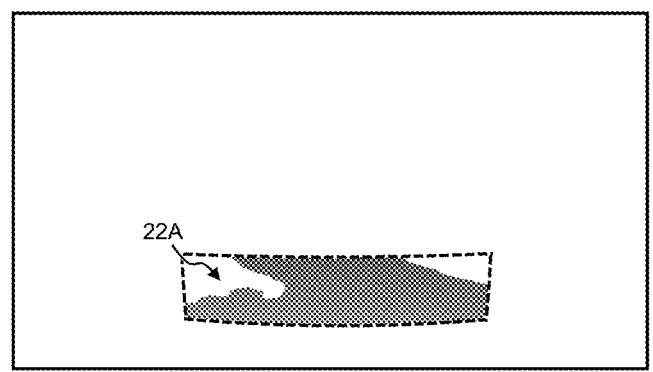
FIG. 4B is a diagram for explaining the execution result of the process shown in FIG. 2.

FIG. 4A shows the plane area 21 and the plurality of partial regions 22 shown in FIG. 3C and FIG. 3D, respectively, in an overlapping manner. Further, FIG. 4B illustrates an example of the depth extracted by the depth extraction processing P33 with respect to the partial region 22A illustrated in FIG. 4A. In FIG. 4B, it is understood that the depth in the region of the common portion between the partial region 22A and the plane area 21 is extracted from the depths shown in FIG. 3C.

The partial region 22B shown in FIG. 4A has no common portion with the plane area 21. Such a partial region 22 can be handled by executing the above-described processing on another plane area 21 in which another horizontal plane or vertical plane is reflected. For example, for the partial region 22B, the above processing can be executed on another plane area 21 specified as a region in which a wall appears.

Refer to FIG. 2 again. The regression plane calculation processing P34 calculates a regression plane representing a horizontal plane or a vertical plane based on the extracted depth for each partial region 22. The regression plane calculated for each partial region 22 is associated with the corresponding partial region 22.

The regression plane calculation processing P34 executes processing as follows, for example.

First, the regression plane calculation processing P34 acquires the position of the plane area 21 included in the target partial region 22 in the world coordinates (X, Y, Z) from the internal parameters of the camera 200 and the depth extracted for the target partial region 22. That is, when the extracted depth is represented by D (M, N), the coordinates (M, N) on the image of the plane area 21 included in the target partial region 22 are converted into world coordinates (X, Y, Z) using the internal parameters of the camera 200 and the extracted depth D (M, N).

Then, the regression plane calculation processing P34 performs regression analysis using the position of the plane area 21 in the acquired world coordinates (X, Y, Z) as an explanatory variable, thereby calculating a regression plane representing a horizontal plane or a vertical plane with respect to the partial region 22 to be processed. In this case, the regression plane is expressed by a plane equation in world coordinates (X, Y, Z) with the position of the camera 200 as the origin.

The calibration value calculation processing P35 calculates a calibration value by comparing the calculated position of the camera 200 with respect to the regression plane and the installation position of the camera 200 with respect to the horizontal plane or the vertical plane managed in the depth estimation apparatus 10 for each partial region 22. That is, in the depth estimation apparatus 10 according to the present embodiment, the calibration value is managed for each partial region 22.

As described above, the regression plane is calculated for each partial region 22 from the estimated depth. Further, it can be expected that errors occurring in the respective partial regions 22 are of the same degree. Therefore, it is considered that the difference between the position of the camera 200 with respect to the regression plane and the installation position of the camera 200 with respect to the horizontal plane or the vertical plane is an amount proportional to the error occurring in each partial region 22. Therefore, by comparing the position of the camera 200 with respect to the regression plane and the installation position of the camera 200 with respect to the horizontal plane or the vertical plane, an appropriate calibration value can be calculated for each partial region 22.

Figure 4C:
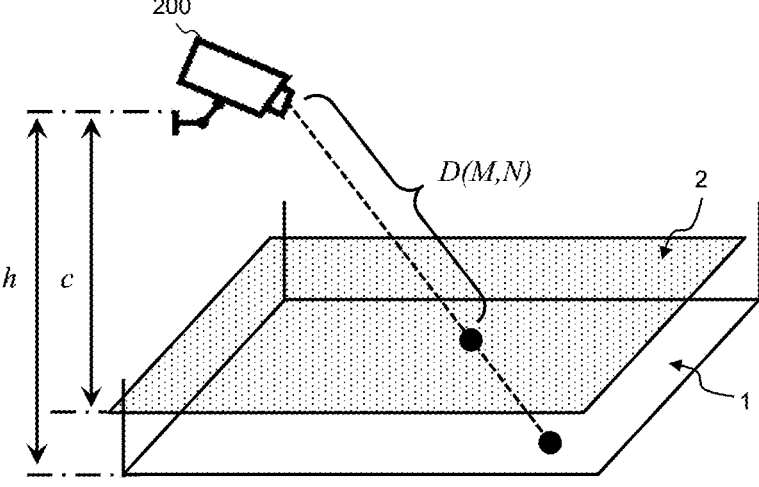
FIG. 4C is a diagram for explaining the execution result of the process shown in FIG. 2.

For example, the calibration value calculation processing P35 may calculate the calibration value as follows. Now, as shown in FIG. 4C, it is assumed that the installation position of the camera 200 with respect to the horizontal plane 1 is given by the height h of the camera 200 with respect to the horizontal plane 1. It is also assumed that a regression plane 2 is calculated by the regression plane calculation processing P34 for a certain partial region 22. Then, it is assumed that the height of the camera 200 with respect to the regression plane 2 is represented by c from the calculated expression of the regression plane 2. At this time, the calibration value calculation processing P35 may calculate the calibration value for the partial region 22 as h/c which is a scale factor for the estimated depth.

Depending on the pattern of the plurality of partial regions 22 that are set, a region that is not included in any of the partial regions 22 may exist in the image. For example, in the pattern shown in FIG. 4A, the regions at the four corners are not included in any of the partial regions 22. For such a region, a calibration value may be given by referring to a calibration value calculated for the partial region 22 in the vicinity. For example, the calibration value for the lower right corner region shown in FIG. 4A may be the mean value of the calibration value calculated for the partial region 22C and the calibration value calculated for the partial region 22D. In the partial region 22 in the vicinity, the degree of the error caused by the distortion is considered to be close. Therefore, by executing the processing in this way, it is possible to appropriately give the calibration value to the region which is not included in any partial region 22.

3. Calibration Processing

Next, the calibration processing P20 will be described in detail. As described above, the depth estimation apparatus 10 according to the present embodiment manages the calibration value for each partial region 22. Therefore, the calibration processing P20 performs calibration of the estimated depth based on the corresponding calibration value in each partial region 22.

For example, the calibration processing P20 executes the following processing. It is assumed that the depth estimated by the depth estimation processing P10 is D (M, N). It is also assumed that a scale factor $\alpha$ is managed as a calibration value for each partial region 22. At this time, the calibration processing P20 performs calibration by calculating $\alpha \times D$ (M, N) using the corresponding scale factor $\alpha$ in each partial region 22. In this case, the depth estimation apparatus 10 outputs $\alpha \times D$ (M, N) as the estimation result.

4. Configuration

Figure 5:
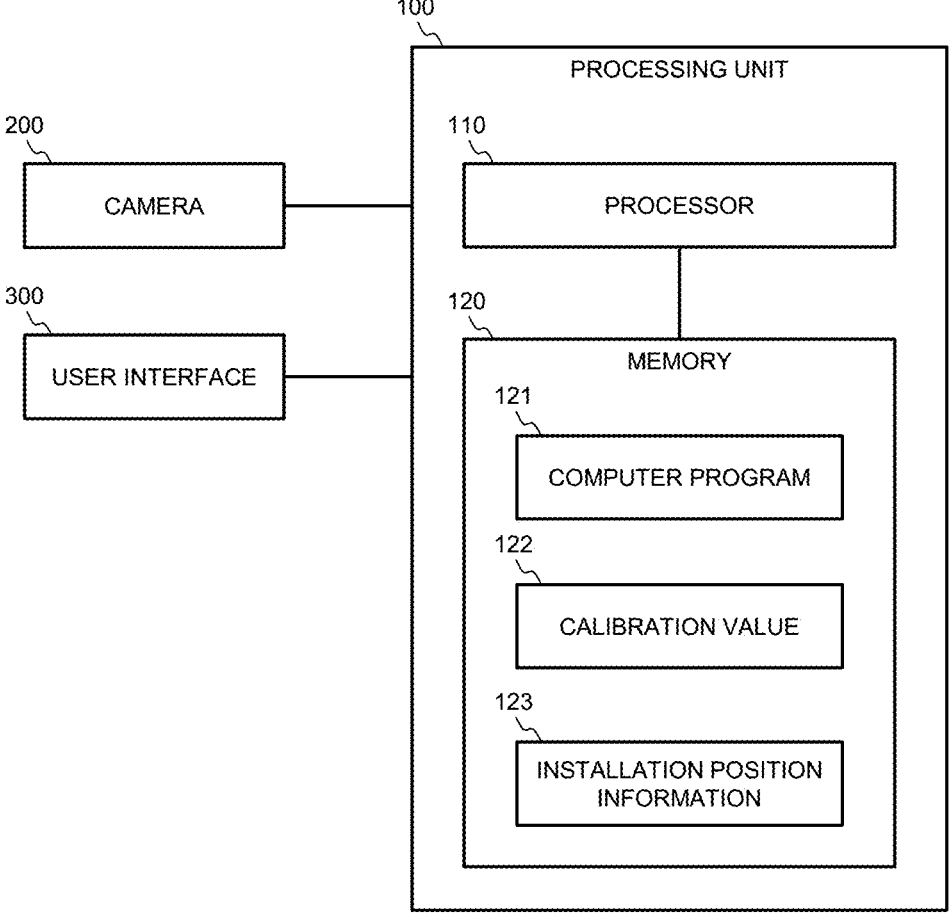
FIG. 5 is a diagram showing an example of a configuration of the depth estimation apparatus according to the present embodiment.

Hereinafter, a configuration of the depth estimation apparatus 10 according to the present embodiment will be described. FIG. 5 is a diagram showing an example of the configuration of the depth estimation apparatus 10 according to the present embodiment.

The depth estimation apparatus 10 includes a processing unit 100, a camera 200, and a user interface 300.

The processing unit 100 is a computer including one or more processors 110 (hereinafter, simply referred to as "processor 110" or "processing circuitry") and one or more memories 120 (hereinafter, simply referred to as "memory 120"). The processing unit 100 is configured to be able to communicate with the camera 200 and the user interface 300.

The processor 110 executes various processes. The processor 110 can be configured by, for example, a central processing unit (CPU) including an arithmetic device, a register, and the like. The memory 120 is connected to the processor 110 and stores various kinds of information necessary for the processor 110 to execute processing. The memory 120 may be configured by a recording medium such as a read only memory (ROM), a random-access memory (RAM), a hard disk drive (HDD), or a solid-state drive (SSD).

The memory 120 stores a computer program 121, a calibration value 122, and installation position information 123.

The computer program 121 is configured by a plurality of instructions for causing the processor 110 to execute various processes. The computer program 121 may be stored in a computer-readable recording medium included in the memory 120. The processor 110 operates in accordance with the computer program 121, thereby realizing the execution of various processes of the processor 110. In particular, the processor 110 executes the process of calculating the calibration value (first process), the depth estimation processing P10, and the calibration processing P20 (second process) as described above.

The calibration value 122 is given to each partial region 22. The processor 110 stores the calibration value 122 calculated for each partial region 22 by executing the processing in the memory 120.

The installation position information 123 gives the installation position of the camera 200 with respect to a horizontal plane or a vertical plane. The installation position information 123 may be stored in the memory 120 in advance. Alternatively, the installation position information 123 may be set by the user via the user interface 300.

The user interface 300 is provided for the user to use the functions of the depth estimation apparatus 10. The user interface 300 is configured by, for example, an input device such as a keyboard or a touch panel, and an output device such as a display or a speaker. The user performs input of setting information, confirmation of the estimation result, acquisition of data of the estimation result, and the like via the user interface 300.

As described above, the depth estimation apparatus 10 according to the present embodiment is configured. The calibration method according to the present embodiment is realized by the processor 110 executing processing.

Figure 6:
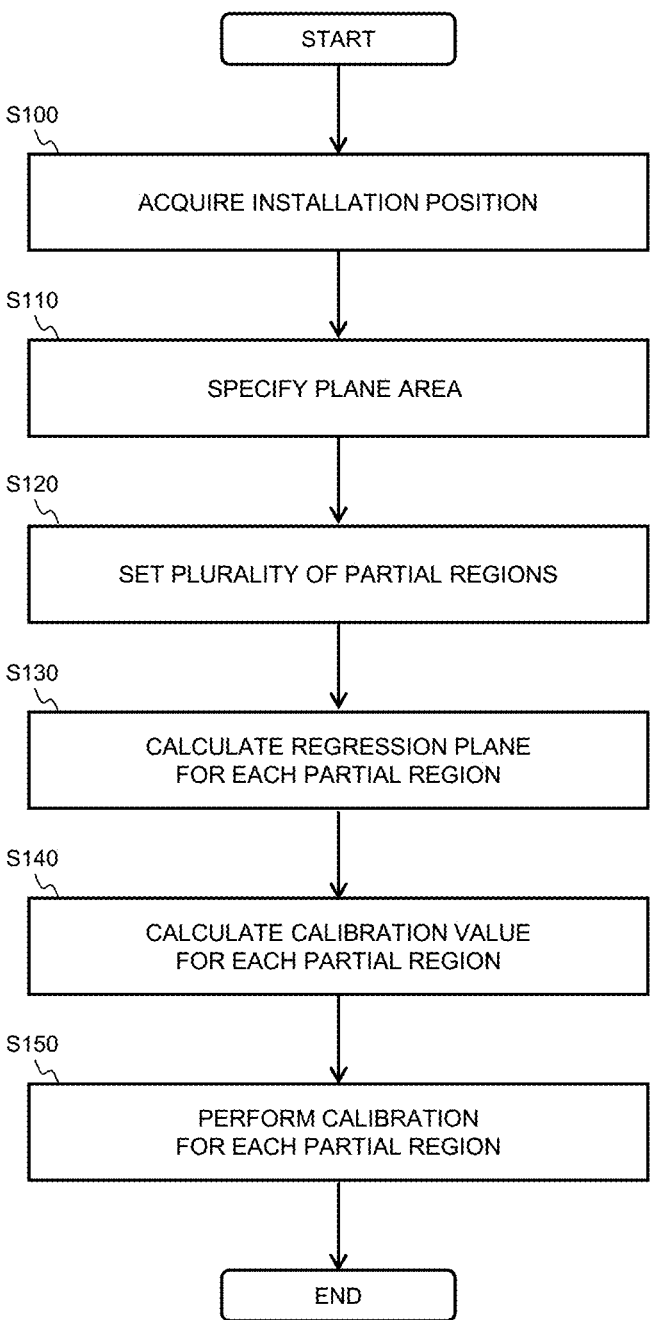
FIG. 6 is a diagram showing an example of processing executed by the depth estimation apparatus according to the present embodiment, regarding calibration of the estimated depth.

FIG. 6 is a flowchart illustrating an example of processing executed by the processor 110 in relation to calibration of the estimated depth.

In step S100, the processor 110 refers to the installation position information 123 to acquire the installation position of the camera 200 with respect to the horizontal plane or the vertical plane.

Next, in step S110, the processor 110 specifies a plane area 21 in which a horizontal plane or a vertical plane is reflected in the image.

Next, in step S120, the processor 110 sets a plurality of partial regions 22 in the image.

Next, in step S130, the processor 110 calculates a regression plane for each partial region 22 based on the estimated depth in the plane area 21 included in each partial region 22.

Next, in step S140, the processor 110 calculates a calibration value for each partial region 22 by comparing the position of the camera 200 with respect to the regression plane and the installation position acquired in step S100.

Next, in step S150, the processor 110 performs calibration of the estimated depth based on the corresponding calibration value in each partial region 22.

In this way, the calibration method according to the present embodiment is realized. The calibration program according to the present embodiment is realized by the computer program 121 that causes the processor 110 to execute the processing in this way.

5. Effect

As described above, according to the present embodiment, the regression plane 2 representing the horizontal plane or the vertical plane is calculated for each partial region 22 set in the image based on the estimated depth in the plane area 21 included in each partial region 22. Thereafter, the calibration value is calculated for each partial region 22 by comparing the position of the camera 200 with respect to the regression plane and the installation position of the camera 200 with respect to the horizontal plane or the vertical plane. Thus, an appropriate calibration value can be calculated for each partial region 22. Then, in each partial region 22, the calibration of the estimated depth is performed based on the corresponding calibration value. Thus, it is possible to realize highly accurate depth estimation without requiring manual work or an additional device.

What is claimed is:

1. A depth estimation apparatus comprising:
   processing circuitry configured to analyze an image captured by a camera to estimate a depth in the image; and
   a memory storing information on an installation position of the camera with respect to a horizontal plane or a vertical plane, wherein
   the processing circuitry is further configured to execute:
      a first process of calculating a calibration value for an estimated depth; and
      a second process of calibrating the estimated depth based on the calibration value, the first process includes:
   specifying a plane area in the image in which the horizontal plane or the vertical plane is reflected;
   setting a plurality of partial regions in the image;
   calculating a regression plane, for each of the plurality of partial regions, representing the horizontal plane or the vertical plane based on the estimated depth of the plane area included in the each partial region; and
   calculating the calibration value for each of the plurality of partial regions by comparing the installation position with a position of the camera with respect to the regression plane, and
the second process includes calibrating the estimated depth for each of the plurality of partial regions based on the calibration value corresponding to the each partial region.

2. The depth estimation apparatus according to claim 1, wherein
   each of the plurality of partial regions is a region surrounded by sides with a curvature, and
   the curvature is larger with respect to the each partial region which is farther from a center of the image.

3. The depth estimation apparatus according to claim 1, wherein
   a size of each of the plurality of partial regions is smaller as the each partial region is farther from a center of the image.

4. A calibration method for calibrating an estimated depth in an image captured by a camera, the calibration method, which is executed by a computer, comprising:
   acquiring information on an installation position of the camera with respect to a horizontal plane or a vertical plane;
   specifying a plane area in the image in which the horizontal plane or the vertical plane is reflected;
   setting a plurality of partial regions in the image;
   calculating a regression plane, for each of the plurality of partial regions, representing the horizontal plane or the vertical plane based on the estimated depth of the plane area included in the each partial region;
   calculating the calibration value for each of the plurality of partial regions by comparing the installation position with a position of the camera with respect to the regression plane; and
   calibrating the estimated depth for each of the plurality of partial regions based on the calibration value corresponding to the each partial region.

5. A non-transitory computer readable recording medium on which a computer program for calibrating an estimated depth in an image captured by a camera,
   the computer program, when executed by a computer, causing the computer to execute:
      acquiring information on an installation position of the camera with respect to a horizontal plane or a vertical plane;
      specifying a plane area in the image in which the horizontal plane or the vertical plane is reflected;
      setting a plurality of partial regions in the image;
      calculating a regression plane, for each of the plurality of partial regions, representing the horizontal plane or the vertical plane based on the estimated depth of the plane area included in the each partial region;
      calculating the calibration value for each of the plurality of partial regions by comparing the installation position with a position of the camera with respect to the regression plane; and calibrating the estimated depth for each of the plurality of partial regions based on the calibration value corresponding to the each partial region.

* * * * *